(12) United States Patent
Hwang et al.

(10) Patent No.: US 9,993,893 B2
(45) Date of Patent: Jun. 12, 2018

(54) APPARATUS AND METHOD FOR TREATING SURFACE OF STRIP CASTING TWIN ROLL

(71) Applicant: POSCO, Pohang-si, Gyeongsangbuk-do (KR)

(72) Inventors: Suk Kyun Hwang, Pohang-si (KR); Ji Woo Im, Pohang-si (KR); Sun Mi Kim, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 155 days.

(21) Appl. No.: 15/247,504

(22) Filed: Aug. 25, 2016

(65) Prior Publication Data

US 2017/0113299 A1    Apr. 27, 2017

(30) Foreign Application Priority Data

Oct. 26, 2015   (KR) .......................... 10-2015-0148469

(51) Int. Cl.

| | |
|---|---|
| *B23K 26/352* | (2014.01) |
| *B23K 26/066* | (2014.01) |
| *B23K 26/03* | (2006.01) |
| *B22D 11/06* | (2006.01) |
| *B23K 26/00* | (2014.01) |
| *B23K 26/08* | (2014.01) |
| *B23K 26/362* | (2014.01) |

(52) U.S. Cl.
CPC ........ *B23K 26/032* (2013.01); *B22D 11/0651* (2013.01); *B22D 11/0665* (2013.01); *B22D 11/0674* (2013.01); *B23K 26/0084* (2013.01); *B23K 26/066* (2015.10); *B23K 26/0823* (2013.01); *B23K 26/352* (2015.10); *B23K 26/362* (2013.01)

(58) Field of Classification Search
CPC .............. B23K 26/032; B23K 26/0823; B23K 26/0084; B23K 26/352; B23K 26/066; B22D 11/0651; B22D 11/0665
USPC ........................................ 219/121.68, 121.69
See application file for complete search history.

(56) References Cited

U.S. PATENT DOCUMENTS 5,807,444 A * 9/1998 Paradis et al. ................ 148/542
8,122,937 B2   2/2012 Eastman

FOREIGN PATENT DOCUMENTS

| KR | 2002-0026539 A | 4/2002 |
|---|---|---|
| KR | 10-2010-0077261 A | 7/2010 |
| KR | 10-1500221 B1 | 3/2015 |

* cited by examiner

*Primary Examiner* — Samuel M Heinrich
(74) *Attorney, Agent, or Firm* — McDermott Will & Emery LLP

(57) ABSTRACT

An apparatus for treating a surface of a strip casting twin roll includes: a laser machining unit configured to form dimple patterns on a surface of a rotating casting roll using a laser; a machining region processing unit, wherein if the casting roll is rotated by a critical angle, the machining region processing unit calculates a size and a position of a machining region, in which a dimple pattern will be formed, based on image information obtained by imaging the machining region; and a laser beam absorbing unit, wherein if the size of the machining region is smaller than a size of the dimple pattern, the laser beam absorbing unit places a screen at an overlap start position from which the machining region and the dimple pattern start to overlap each other, so as to absorb a laser beam emitted toward a peripheral region of the machining region.

9 Claims, 3 Drawing Sheets

APPARATUS AND METHOD FOR TREATING SURFACE OF STRIP CASTING TWIN ROLL

CROSS-REFERENCE TO RELATED APPLICATION(S)

This application claims benefit of priority to Korean Patent Application No. 10-2015-0148469 filed on Oct. 26, 2015 in the Korean Intellectual Property Office, the disclosure of which is incorporated herein by reference in its entirety.

BACKGROUND

1. Field

The present disclosure relates to an apparatus and method for treating a surface of a strip casting twin roll.

2. Description of Related Art

FIG. 1 is a schematic view illustrating a general twin roll strip caster of the related art.

As illustrated in FIG. 1, in the general twin roll strip caster of the related art, a molten steel pool 8 is formed by supplying molten steel, through a nozzle 4, to a space surrounded by twin rolls 1 and 1' and edge dams 2 attached to both sides of the twin rolls 1 and 1', and as the twin rolls 1 and 1' are rotated, the molten steel is rapidly solidified by a heat flux into the twin rolls 1 and 1' from the molten steel contacting the twin rolls 1 and 1', thereby forming a strip 7.

Since the strip 7 manufactured using the twin roll strip caster of the related art as described above has a low thickness within the range of about 2 mm to about 6 mm, shells solidified at an early stage of the casting process have a significant influence on surface properties of the strip 7. That is, since molten steel makes contact with casting rolls for a very short period of time, solidified shells have an uneven thickness, and thus defects such as cracks or overlap defects may be formed in the surface of a strip. In this case, a subsequent rolling process may be negatively affected, and thus a final product may have poor gloss and a low value.

To address this, dimples are formed in the surfaces of casting rolls through a surface treatment process by various methods so as to prevent the formation of defects in a strip, such as surface cracks, by effectively distributing thermal stress in the strip during a strip casting process. Such dimples lead to the formation of gas gaps functioning as adiabatic layers between cooling rolls and solidified shells, thereby reducing heat extraction from the cooling rolls and guaranteeing gradual cooling of the solidified shells. In addition, since shells start to solidify from peripheral regions (edge regions) of the dimples, the thickness of the shells may be uniform.

Such dimples are formed by various methods. For example, surfaces of casting rolls may be machined using a laser to form dimples.

According to the above-mentioned laser machining method for machining surfaces of casting rolls using a laser, a geometric pattern having a predetermined size is formed on a cylindrical casting roll. However, after the cylindrical casting roll is rotated once, the remaining amount of a joining region of the pattern is not constant, and thus it is difficult to exactly connect joining portions of the pattern. Particularly, each casting roll weighs more than 20 tons and has a large machining area (about 1340 mm in width×about 1280 mm in diameter). Thus, many pieces of equipment and a great degree of effort are required to finish a fine machining process within an intended period of time with an intended degree of precision. In general, when a casting roll is rotated, it is very difficult to obtain positional precision within the range of 1 mm or less using a driving unit.

When the final line of a casting roll is machined, ends of the final line and the first line have to be exactly coincident with each other. However, it is impossible to exactly align the ends of the final and first lines because the circumference of a casting roll having a diameter D is an irrational number ($\pi \times D$) and the unit height h of dimples is a rational number.

RELATED ART DOCUMENT

Patent Document

1. Korean Patent Application Laid-open Publication No. 10-2010-0077261 (title: system for treating surface of strip casting roll, and casting roll surface-treated with the system)

SUMMARY

An aspect of the present disclosure may provide an apparatus and method for treating a surface of a strip casting twin roll.

According to an aspect of the present disclosure, an apparatus for treating a surface of a strip casting twin roll, the apparatus may include: a laser machining unit configured to form dimple patterns on a surface of a rotating casting roll using a laser; a machining region processing unit, wherein if the casting roll is rotated by a critical angle, the machining region processing unit calculates a machining region, in which a dimple pattern will be formed, based on image information obtained by imaging the machining region; and a laser beam absorbing unit, wherein if the machining region is smaller than the dimple pattern, the laser beam absorbing unit places a screen at an overlap start position from which the machining region and the dimple pattern start to overlap each other, so as to absorb a laser beam emitted toward a peripheral region of the machining region.

According to another aspect of the present disclosure, a method for treating a surface of a strip casting twin roll may include: forming a dimple pattern on a surface of a rotating casting roll using a laser; if the casting roll is rotated by a critical angle, after imaging a machining region in which the dimple pattern will be formed, calculating the machining region based on a captured image; and if the machining region is smaller than the dimple pattern, moving a screen to an overlap start position from which the machining region and the dimple pattern start to overlap each other so as to absorb a laser beam emitted toward a peripheral region of the machining region.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
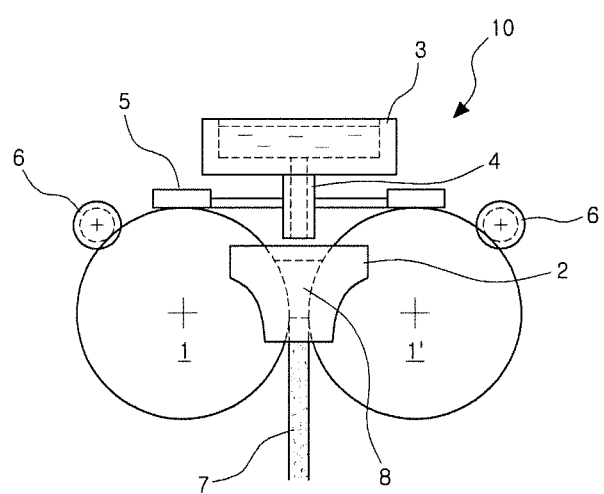
FIG. 1 is a schematic view illustrating a twin roll strip caster of the related art.

Exemplary embodiments will now be described in detail with reference to the accompanying drawings, so that those of ordinary skill in the related art may clearly understand the scope of the present disclosure. Detailed descriptions related to well-known functions or configurations will be ruled out in order not to unnecessarily obscure subject matters of the exemplary embodiments of the present disclosure. Furthermore, in the drawings, elements having similar functions and effects are denoted with the same reference numerals throughout.

Furthermore, in the present disclosure, when a part is referred to as being "connected to" or "coupled to" another part, it may be directly connected or coupled to the other part or intervening parts may be present. It will be further understood that the terms "comprises" and/or "comprising" used herein specify the presence of stated features or elements, but do not preclude the presence or addition of one or more other features or elements.

Hereinafter, an apparatus and method for treating a surface of a strip casting twin roll will be described in detail according to exemplary embodiments with reference to the accompanying drawings.

First, before describing exemplary embodiments of the present disclosure, processes for forming dimples in a casting roll by a laser machining method will be simply described.

First, a masking film material such as a liquid photoresist resin or an acid-resistant masking paint curable at room temperature is uniformly applied to a surface of a casting roll using a device such as a sprayer, and the casting roll is maintained at room temperature so as to dry the masking film material and thus form a masking film. After the masking film is formed on the surface of the casting roll as described above, regions of the masking film corresponding to etching regions are only removed using a laser device.

Since only the masking film is selectively removed using the laser device, the casting roll is not required to have a smooth surface for attachment of a film necessary for preventing absorption of light in an etching process of the related art, and processes subsequent to an exposure process, such as a darkroom developing process, may be omitted. Therefore, processes may be simply performed owing to reduced time and space limitations, and a high degree of workability may be obtained.

Next, an etchant is sprayed onto the surface of the casting roll patterned using the laser device so as to etching regions of the casting roll from which the masking film is partially removed and thus to form fine dimples or lines or areas of fine dimples in the casting roll. Next, the masking film remaining on the casting roll is removed using a film removing device, and finish processes such as a surface cleaning process are performed on the casting roll.

Figure 2:
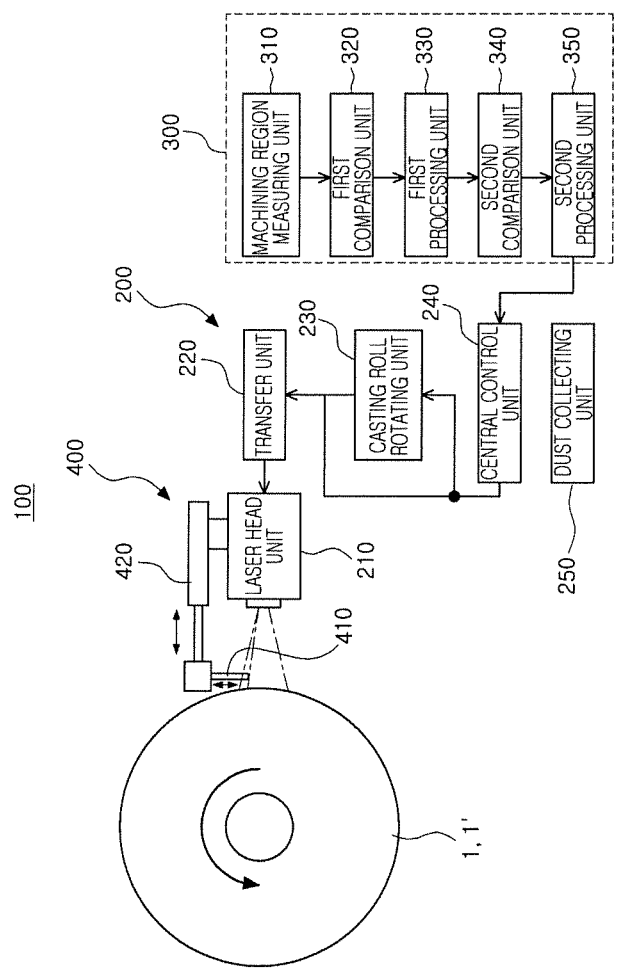
FIG. 2 is a view illustrating an apparatus for treating a surface of a strip casting twin roll according to an exemplary embodiment of the present disclosure.

FIG. 2 is a view illustrating an apparatus 100 for treating a surface of a strip casting twin roll according to an exemplary embodiment of the present disclosure.

As illustrated in FIG. 2, according to the exemplary embodiment of the present disclosure, the apparatus 100 for treating a surface of a strip casting twin roll includes a laser machining unit 200, a machining region processing unit 300, and a laser beam absorbing unit 400.

The laser machining unit 200 forms a dimple pattern on a surface of a rotating casting roll using a laser. To this end, a masking film is formed on the surface of the casting roll.

If the casting roll is rotated by a critical angle, the machining region processing unit 300 calculates a machining region in which the dimple pattern will be formed, based on image information obtained by imaging the machining region.

If the machining region is smaller than the dimple pattern, the laser beam absorbing unit 400 places a screen 410 at an overlap start position from which the machining region and the dimple pattern start to overlap each other, so as to absorb a laser beam emitted toward a peripheral region of the machining region.

The laser beam absorbing unit 400 may include the screen 410 configured to absorb a laser beam, and a moving unit 420 configured to move the screen 410 to the overlap start position based on position information.

Referring to FIG. 2, for example, the laser machining unit 200 may include a laser head unit 210, a transfer unit 220, and a casting roll rotating unit 230, and a central control unit 240.

The laser head unit 210 emits a laser beam having an average power of 20 W to 60 W toward the machining region by using a Q switch or a focal optic. Particularly, the Q switch is a device for repeatedly producing a light pulse having relatively high peak power. The Q switch is turned on and off according to a control signal, and a laser beam is emitted while the Q switch is turned off. The laser head unit 210 may have a depth of focus within the range of 4 mm or greater so that although the distance from the laser head unit 210 to the surface of the casting roll deviates from a laser focal length by ±2 mm or less, uniform results may be obtained and thus fine dimples may be uniformly formed.

The transfer unit 220 may move the laser head unit 210 to a work position, and the casting roll rotating unit 230 may rotate the casting roll at a preset velocity. In detail, the casting roll rotating unit 230 may rotate the casting roll at an intended velocity using a servo motor or a spindle motor having an output power of 10 KW or greater. The casting roll rotating unit 230 may guarantee a minimum resolution of 10 µm or less per pulse using a gear ratio of 10:1 or greater between a rotation shaft of the casting roll and an encoder rotation shaft. In addition, the casting roll rotating unit 230 may vary the rotational velocity of the casting roll within the range of 0.1 RPM to 50 RPM, and during acceleration or deceleration, the casting roll rotating unit 230 may vary the rotational velocity of the casting roll at a rate of 1 round/sec or greater. If the rotational velocity or acceleration of the casting roll is excessively low, process efficiency may decrease, and if the rotational velocity or acceleration of the casting roll is excessively high, it may be difficult to control laser power. Thus, the rotational velocity and acceleration of the casting roll may be adjusted within the above-mentioned ranges so as to precisely form fine dimples having an intended size.

The central control unit 240 receives information regarding the rotation of the casting roll and the position of the laser head unit 210 in real time and determines a laser beam output position and time.

For example, when the transfer unit 220 horizontally moves in a direction parallel with the surface of the casting roll, the central control unit 240 may adjust the angle of a reflection lens of the laser head unit 210 and may precisely control the transfer unit 220 moving the laser head unit 210 so as to obtain an accuracy of 10 µm or less. Therefore, patterns formed on the casting roll may be exactly connected to each other without overlapping or having a large spacing in a horizontal direction.

In addition, when the transfer unit 220 moves in a direction perpendicular to the surface of the casting roll, information related to the direction perpendicular to the surface of the casting roll may be input with a resolution precision of 1 µm or less by using an encoder having a resolution of 20,000 or more pulses per revolution and a gear ratio of 10:1 or greater between the rotation shaft of the casting roll and the encoder rotation shaft. Thus, line patterns may be precisely connected in a vertical direction.

In addition, the laser machining unit 200 may further include a dust collecting unit 250. After a laser beam is emitted to the surface of the casting roll, masking film dust separated from the surface of the casting roll may be collected by the dust collecting unit 250.

The machining region processing unit 300 may include a machining region measuring unit 310, a first comparison unit 320, a first processing unit 330, a second comparison unit 340, and a second processing unit 350.

The machining region measuring unit 310 may measure a machining region. In detail, the machining region measuring unit 310 may be an imaging device including a charge coupled device (CCD) image sensor or a complementary metal oxide semiconductor (CMOS) image sensor.

The first comparison unit 320 compares the rotation angle of the casting roll with the critical angle.

If the rotation angle of the casting roll is greater than the critical angle, the first processing unit 330 calculates the size and position of the machining region based on a captured image.

The second comparison unit 340 compares the size of the machining region with the size of the dimple pattern.

If the size of the machining region is smaller than the size of the dimple pattern, the second processing unit 350 provides positional information regarding an overlap start position from which the machining region and the dimple pattern start to overlap each other to the laser beam absorbing unit 400.

Figure 3:
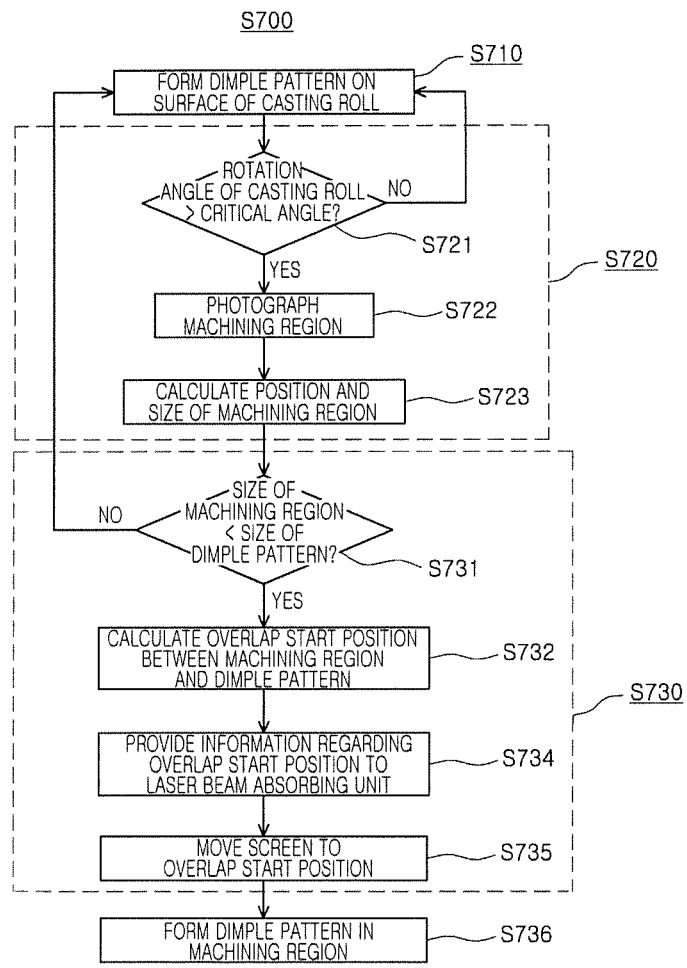
FIG. 3 is a flowchart illustrating a method for treating a surface of a strip casting twin roll according to an exemplary embodiment of the present disclosure.

FIG. 3 is a flowchart illustrating a method S700 for treating a surface of a strip casting twin roll according to an exemplary embodiment of the present disclosure.

As illustrated in FIG. 3, the method S700 for treating a surface of a strip casting twin roll includes first to third operations S710 to S730.

In the first operation S710, a dimple pattern may be formed on a surface of a rotating casting roll using a laser.

In the second operation S720, if the casting roll is rotated by a critical angle, a machining region in which the dimple pattern will be formed may be photographed, and the position and size of the machining region may be calculated based on a captured image.

Specifically, in the second operation S720, the rotation angle of the casting roll is compared with the critical angle (S721). If the rotation angle of the casting roll is greater than the critical angle, a machining region measuring unit photographs a machining region (S722), and the size and position of the machining region are calculated based on image information obtained by imaging the machining region (S723).

Next, in the third operation S730, the size of the machining region is compared with the size of the dimple pattern. If the size of the machining region is smaller than the size of the dimple pattern, a screen of a laser beam absorbing unit may be moved to an overlap start position from which the machining region and the dimple pattern start to overlap each other, based on positional information regarding the overlap start position.

Specifically, in the third operation S730, the size of the machining region is compared with the size of the dimple pattern (S731). If the size of the machining region is smaller than the size of the dimple pattern, an overlap start position from which the machining region and the dimple pattern start to overlap each other is calculated (S732), and positional information regarding the overlap start position is provided to the laser beam absorbing unit (S734).

Then, the laser beam absorbing unit may move the screen to the overlap start position (S735).

Therefore, since the screen is placed in the overlap start position between the machining region and the dimple pattern, a laser beam emitted toward a peripheral region of the machining region may be absorbed by the screen, and thus defects caused by overlaps between dimple patterns may be prevented.

In this manner, dimple patterns may be easily formed on a strip casting twin roll, and thus a casting process may be performed without defects such as cracks and depressions occurring according to types of steels.

In the present disclosure, the term "unit" may refer to a computing device including at least one processing unit and at least one memory.

Examples of the processing unit may include a central processing unit (CPU), a graphic processing unit (GPU), a microprocessor, an application specific integrated circuit (ASIC), and a field programmable gate array (FPGA). The processing unit may include a plurality of cores.

Examples of the memory may include a volatile memory such as a random access memory (RAM), a non-volatile memory such as a read only memory (ROM) or a flash memory, and a combination thereof.

In addition, the computing device may further include a storage. Examples of the storage may include a magnetic storage and an optical storage. However, the storage is not limited thereto.

Computer-readable instructions for implementing one or more embodiments of the present disclosure may be stored in the storage, and other computer-readable instructions for executing an operating system or application programs may also be stored in the storage. Computer-readable instructions stored in the storage may be loaded in the memory and may then be executed by the processing unit.

In addition, the computing device may include a communication connection(s) for communication with other devices over networks. Examples of the communication connection(s) may include a modem, a network interface card (NIC), an integrated network interface, a radio frequency transmitter/receiver, an infrared port, a universal serial bus (USB) connection, and an interface for connecting one computing device to another computing device. In addition, the communication connection(s) may include a wired connection or a wireless connection.

The above-described elements of the computing device may be connected to each other through a network or other various connection devices such as buses (e.g., peripheral component interconnect (PCI) buses, USBs, firmware (IEEE 1394), or optical buses).

As set forth above, according to apparatus and method for treating a surface of a strip casting twin roll of the exemplary embodiments, dimple patterns may be easily formed on surfaces of casting rolls, and thus steel strips may be manufactured through a casting process without defects such as cracks or depressions according to types of steels.

While exemplary embodiments have been shown and described above, these embodiments are non-limiting examples, and various modifications and variations could be made without departing from the scope of the present invention.

The embodiments of the present disclosure are for illustrative purposes only and are not intended to limit the scope of the present invention. Therefore, it should be understood that modifications, equivalents, and replacements made from the embodiments are within the scope of the present invention as defined by the appended claims.

What is claimed is:

1. An apparatus for treating a surface of a strip casting twin roll, the apparatus comprising:
    a laser machining unit configured to form dimple patterns on a surface of a rotating casting roll using a laser;
    a machining region processing unit, wherein if the casting roll is rotated by a critical angle, the machining region processing unit calculates a size and a position of a machining region, in which a dimple pattern will be formed, based on image information obtained by imaging the machining region; and
    a laser beam absorbing unit, wherein if the size of the machining region is smaller than a size of the dimple pattern, the laser beam absorbing unit places a screen at an overlap start position from which the machining region and the dimple pattern start to overlap each other, so as to absorb a laser beam emitted toward a peripheral region of the machining region.

2. The apparatus of claim 1, wherein a masking film is formed on the surface of the casting roll.

3. The apparatus of claim 1, wherein the laser machining unit comprises:
    a laser head unit configured to emit a laser beam toward the machining region;
    a transfer unit configured to move the laser head unit to a work position;
    a casting roll rotating unit configured to rotate the casting roll at a preset velocity; and
    a central control unit configured to determine a laser beam output position and a laser beam output time by receiving information regarding rotation of the casting roll and a position of the laser head unit in real time.

4. The apparatus of claim 3, wherein the laser machining unit further comprises a dust collecting unit configured to collect masking film dust separated from the surface of the casting roll after a laser beam is emitted to the surface of the casting roll.

5. The apparatus of claim 1, wherein the machining region processing unit comprises:
    a first comparison unit configured to compare a rotation angle of the casting roll with a critical angle;
    a first processing unit, wherein if the rotation angle of the casting roll is greater than the critical angle, the first processing unit calculates the size and position of the machining region based on a captured image of the machining region;
    a second comparison unit configured to compare the size of the machining region with the size of the dimple pattern; and
    a second processing unit, wherein if the size of the machining region is smaller than the size of the dimple pattern, the second processing unit provides positional information regarding the overlap start position from which the machining region and the dimple pattern start to overlap each other to the laser beam absorbing unit.

6. The apparatus of claim 5, wherein the laser beam absorbing unit comprises:
    a laser beam blocking film; and
    a moving unit configured to move the laser beam blocking film to the overlap start position based on the positional information.

7. A method for treating a surface of a strip casting twin roll, the method comprising:
    after rotating a casting roll by a predetermined angle, forming a dimple pattern having a predetermined size on a surface of the casting roll using a line laser;
    if the casting roll is rotated by a critical angle, after imaging a machining region in which the dimple pattern will be formed, calculating the machining region based on a captured image; and
    after comparing a size of the machining region with the size of the dimple pattern, if the size of the machining region is smaller than the size of the dimple pattern, moving a screen of a laser beam absorbing unit to an overlap start position from which the machining region and the dimple pattern start to overlap each other, based on positional information regarding the overlap start position.

8. The method of claim 7, wherein the calculating of the machining region comprises:
    comparing a rotation angle of the casting roll with the critical angle;
    providing image information regarding the machining region; and
    if the rotation angle of the casting roll is greater than the critical angle, calculating the size and a position of the machining region based on the image information.

9. The method of claim 7, wherein the moving of the screen comprises:
    comparing the size of the machining region with the size of the dimple pattern;
    calculating the overlap start position from which the machining region and the dimple pattern start to overlap each other, if the size of the machining region is smaller than the size of the dimple pattern;
    providing positional information regarding the overlap start position to the laser beam absorbing unit; and
    moving the screen of the laser beam absorbing unit to the overlap start position.

* * * * *